US006409559B2

(12) United States Patent
Walsh

(10) Patent No.: US 6,409,559 B2
(45) Date of Patent: Jun. 25, 2002

(54) AQUATIC TOWING DEVICE

(76) Inventor: Raymond Walsh, 2908 Saturn Dr., Lake Orion, MI (US) 48360

( * ) Notice: Subject to any disclaimer, the term of this patent is extended or adjusted under 35 U.S.C. 154(b) by 0 days.

(21) Appl. No.: 09/858,204

(22) Filed: May 15, 2001

Related U.S. Application Data

(60) Provisional application No. 60/204,976, filed on May 17, 2000.

(51) Int. Cl.$^7$ ............................................... B63B 1/100
(52) U.S. Cl. .......................................... 441/66; 280/18
(58) Field of Search ............................ 114/345; 441/65, 441/66; 280/18

(56) References Cited

U.S. PATENT DOCUMENTS

| | | | | |
|---|---|---|---|---|
| 3,082,443 A | * | 3/1963 | Kimura | ......................... 441/65 |
| 4,206,933 A | * | 6/1980 | Koch | ............................ 280/18 |
| 6,010,381 A | * | 1/2000 | Peterson | ..................... 114/345 |

* cited by examiner

*Primary Examiner*—Jesus D. Sotelo
(74) *Attorney, Agent, or Firm*—Gifford, Krass, Groh, Sprinkle, Anderson & Citkowski, P.C.

(57) ABSTRACT

An aquatic device for carrying a rider, includes a buoyant mat having handles and towing attachments. The mat has inflatable air channels which are formed to permit the mat to arch over the water, carrying the rider when towed at proper speed. One or more air channels extend transversely to the major axis along a forward portion of the mat. A rear portion has air channels which radiate out towards a peripheral air channel. The towing attachments are mounted to the forward edge of the mat.

9 Claims, 2 Drawing Sheets

AQUATIC TOWING DEVICE

This application claims benefit of U.S. Provisional No. 60/204,976 filed May 17, 2000.

FIELD OF THE INVENTION

For some time, water sports enthusiasts have ridden on inner tubes towed by pleasure water craft. The inner tube has handgrips which permit the rider to grasp the tube and steer the tube while it is being towed. The tube bounces on the wake of the towing craft and on waves. When the tube is towed at higher speeds, the impact of the wave and wake bounces is great. Accordingly, it would be desirable to provide a device which could be ridden at high speeds and readily controllable by the user and comfortable to use.

SUMMARY OF THE INVENTION

An aquatic device for carrying a rider includes a buoyant mat having handles and towing attachment. The mat has a forward section which lifts off the water in an arch to form a tunnel for air passing through and under a rear section which curves downwardly and rearwardly to a peripheral edge adjacent the water. The rider lays on a top layer surface of the mat grasping the handles with his feet extending rearwardly over the top layer. The mat has a plurality of air chambers which are inflated with air to provide buoyancy. The channels of the forward section extend transversely to resist folding when being towed. A peripheral skirt portion rides on the water.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
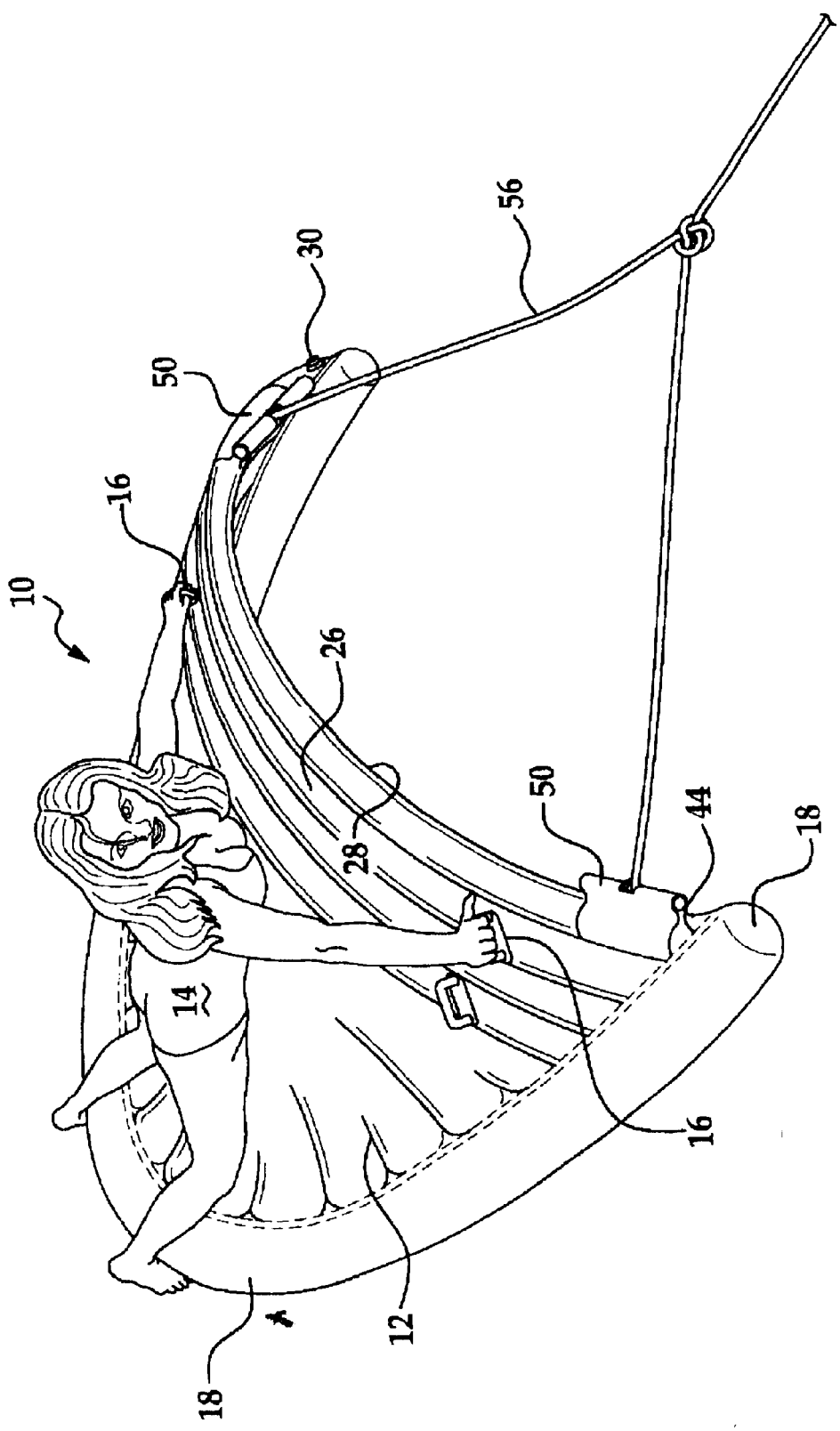
FIG. 1 is a perspective view of the aquatic device shown in use as it is towed.
Figure 3:
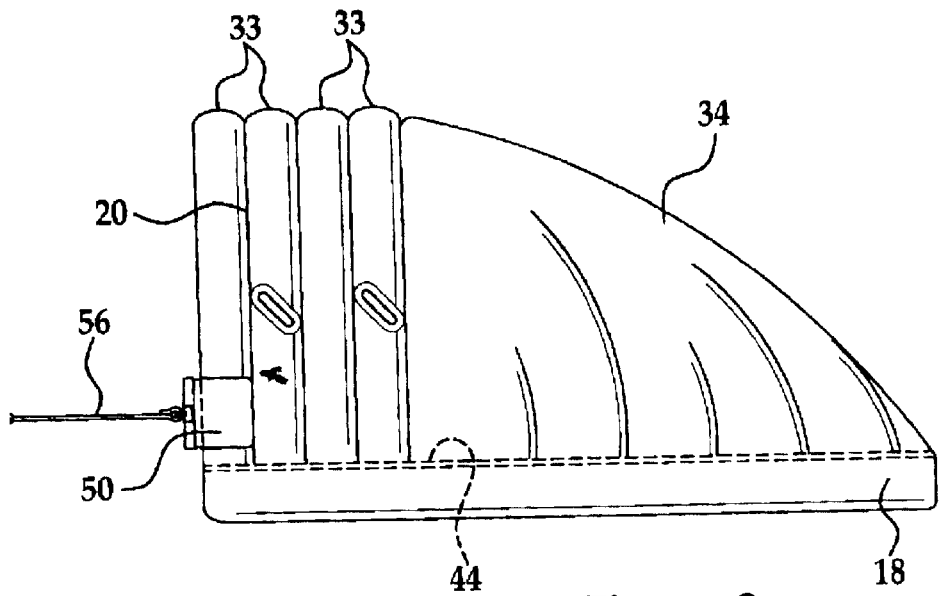
FIG. 3 is a side view of the aquatic device shown in its position in use in accordance with the invention;.

As shown in FIG. 1, a novel aquatic sport device 10 includes a buoyant mat 12, adapted to be towed across the surface of a body of water by a boat (not shown). The periphery of the mat lays flat on the water when at rest (FIG. 3). However, the rear channels are formed to make a bubble centered at the joinder of the frontal portion and the rear portion. The bubble slopes downwardly to the peripheral portion. A rider 14 lays face down on a top surface of the mat 12 and grasps a pair of hand holds 16. When towed, the mat 12 forms a scoop and lifts off the water. The center of the mat arches to approximately 2 to 2½ feet when the mat is towed behind the boat at speeds of 25 to 30 miles per hour.

Figure 2:
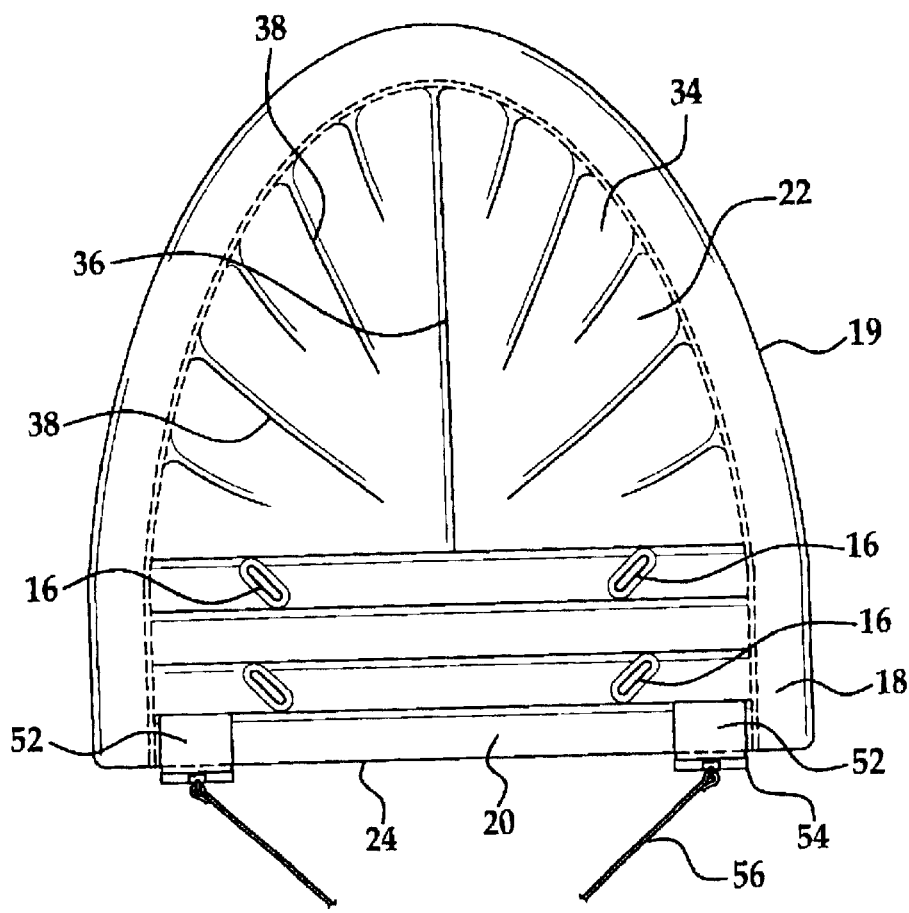
FIG. 2 is a top view of the device in accordance with the invention.

In the preferred embodiment, the mat 12 is formed of a series of interconnected air chambers which are inflated with air in the same manner as an inflatable raft. Interconnecting air passages extend between the chambers to permit inflation of all of the chambers. However, it is within the contemplation of the invention to use other materials, such as closed celled foam, which provide sufficient buoyancy and flexibility. As shown in FIG. 2, The mat includes a skirt portion 18, a rectangular forward portion 20, a semi-elliptical rear portion 22. The mat has an outer peripheral edge 19. The mat is symmetrical about a major axis "a".

The mat 12 is formed by doubling a sheet of PVC about the front edge 24 to form a top surface layer 26 and a bottom surface layer 28 and seaming the layers as known in the art to form inflatable air chambers. When inflated, the air chambers are tubular with a generally circular cross-section. One or more inlets 30 having threaded nipples are mounted between the layers at the peripheral edge for attachment to an inflation device (not shown). The forward portion 20 includes four air chambers 33 extending transversely between the skirt portion 18. The chambers 33 extend transversely to resist the force of the tow rope to fold the mat together about the major axis when being towed. The first two chambers of the forward portion 20 may be reinforced by doubling the material for both the upper and bottom surface layers. The forward portion 20 is approximately 70 inches wide and 28 inches deep.

The rear portion 22 has a plurality of air chambers 34 which radiate from a center seam line 36 extending perpendicularly from the forward portion 20, as shown in FIG. 2. Seam lines 38 extend from the curved peripheral skirt portion 18 toward the center of the forward portion 20 to form the chambers 34.

As shown in FIGS. 1 and 3, the mat has an inner seam on the bottom layer 28 to form a bend line 44 for the peripheral skirt portion 18. The bend line 44 extends from both sides of the front edge and is spaced inwardly from the peripheral edge 19. The bend line 44 permits the periphery of the mat to bend inwardly to a nearly vertical alignment when the mat is being towed to ride on the water.

One or more pairs of handles 16 with a mounting base are mounted to the top surface layer 26 of the forward portion 20. The pairs of handles 16 are spaced apart approximately 48 inches. The handles extend upwardly for gripping by the rider and are angled at approximately 45° to the front edge to provide hand holds for the rider.

As shown in FIG. 1, a pair of towing attachments 50 are mounted on the front edge 24 adjacent each handle 16. The attachment may be of any suitable type. In the preferred embodiment, a reinforced patch piece 52 with a center aperture is folded over a dowel rod 54 of metal or composite and is affixed to the mat at the forward edge. The patch piece is seamed to hold the rod in position. The aperture provides access to the rod 54 for attachment to a tow rope 56 which is connected to the boat towing the mat 12. The mat can be inserted in a nylon cover which provides a smooth surface and provides flexibility in placement of handles.

OPERATION

To use the aquatic device 10, the rider 14 lays across the top surface layer of the mat grasping the handles. When the aquatic device 10 is towed, air passes over the forward portion 24 above and below the mat to create a pressure differential. The mat acts as an air foil and rises. The mat 12 forms an arc, the top of which is approximately 32 inches from the water surface. The transverse tubes 33 resist folding of the mat. The rear portion 22 assumes an elongated semi-domed shape which curves downwardly from the highest portion of the forward portion 20 to the skirt portion 18. The bend line 44 acts as a live hinge to permit the peripheral portion to easily bend and extend nearly vertically downwardly towards the water to enclose a tunnel over the water.

When the foil is towed at speeds of approximately 25 to 35 miles per hour, the foil will rise and ride on the apparent wind created by the movement of the foil through the air. Pressure differential between the air flowing over the top and bottom of the foil will create lift, forming the dome shape. The rider will be able to "fly" the foil by pushing then pulling the handles to steer and/or lift the foil from the water.

As will be apparent from the attached claims, these and other variations of the invention are within the scope of the invention which is defined by the attached claims.

I claim:

1. A hydraulic device adapted for riding by a person and for towing by a boat, said device comprising:

an elongated buoyant mat having a top surface and a bottom surface, said mat having a front edge and a major axis extending transversely to said front edge, said mat having a curved rear peripheral edge extending between a pair of side edges;

a pair of spaced apart hand holds mounted to said top surface of said mat, said hand holds spaced apart and positioned adjacent said front edge;

a pair of spaced apart towing attachments are mounted to said front edge of said mat, said attachments adopted adapted for connection to a tow line whereby said front edge of said mat forms an arch when said mat is towed by said boat at a predetermined speed.

2. The aquatic device of claim 1, wherein said mat further comprises a plurality of chambers adapted for inflation with air to provide buoyancy.

3. The aquatic device of claim 2, wherein said mat has a forward portion, said forward portion having at least one chamber of said plurality of chambers extending transversely to said major axis.

4. The aquatic device of claim 2, wherein said mat has a rear portion having a curved rear edge.

5. The aquatic device of claim 4, wherein said rear portion has a plurality of radially extending inflation chambers.

6. The aquatic device of claim 4, wherein said rear edge curves elliptically with respect to said major axis.

7. The aquatic device of claim 1, further comprising an inflatable air channel portion extending about said periphery of said mat.

8. The aquatic device of claim 1, wherein said mat has a bend line spaced inwardly from said peripheral edge.

9. The aquatic device of claim 7, wherein said bend line is formed on said bottom surface.

\* \* \* \* \*

UNITED STATES PATENT AND TRADEMARK OFFICE
CERTIFICATE OF CORRECTION

PATENT NO.     : 6,409,559 B2
DATED          : June 25, 2002
INVENTOR(S)    : Raymond Walsh It is certified that error appears in the above-identified patent and that said Letters Patent is hereby corrected as shown below:

<u>Column 3,</u>
Line 17, replace "hand holds" with -- handsholds --.
Line 18, replace "hand holds" with -- handholds --.
Line 21, replace "adopted" with -- adapted --.

Signed and Sealed this

Eleventh Day of February, 2003

JAMES E. ROGAN
*Director of the United States Patent and Trademark Office*